United States Patent
Lin et al.

(10) Patent No.: US 9,736,557 B2
(45) Date of Patent: *Aug. 15, 2017

(54) METHOD FOR ASSIGNING AND PROCESSING A LABEL IN AN OPTICAL NETWORK, OPTICAL COMMUNICATION DEVICE, AND OPTICAL COMMUNICATION SYSTEM

(71) Applicant: Huawei Technologies Co., Ltd., Shenzhen (CN)

(72) Inventors: Yi Lin, Shenzhen (CN); Xiaobing Zi, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 15/090,418

(22) Filed: Apr. 4, 2016

(65) Prior Publication Data

US 2016/0219352 A1 Jul. 28, 2016

Related U.S. Application Data (63) Continuation of application No. 14/616,345, filed on Feb. 6, 2015, now Pat. No. 9,307,303, which is a
(Continued)

(30) Foreign Application Priority Data

Jul. 3, 2009 (CN) .......................... 2009 1 0150111

(51) Int. Cl.
*H04Q 11/00* (2006.01)
*H04J 3/00* (2006.01)
(Continued)

(52) U.S. Cl.
CPC ........ *H04Q 11/0066* (2013.01); *H04J 3/1652* (2013.01); *H04J 3/1664* (2013.01);
(Continued)

(58) Field of Classification Search
CPC ........................... H03J 3/1652; H04J 14/0267
See application file for complete search history.

(56) References Cited

U.S. PATENT DOCUMENTS

| | | | |
|---|---|---|---|
| 7,315,693 B2 | 1/2008 | Ovadia et al. | |
| 7,583,697 B2 | 9/2009 | Zou | |

(Continued)

FOREIGN PATENT DOCUMENTS

| | | | |
|---|---|---|---|
| CN | 1741429 A | 3/2006 | |
| CN | 1805347 A | 7/2006 | |

(Continued)

OTHER PUBLICATIONS

Papadimitriou, "Generalized Multi-Protocol Label Switching (GMPLS) Signaling Extensions for G.709 Optical Transport Networks Control," Jan. 2006, Network Working Group, The Internet Society, Reston, Virginia.
(Continued)

*Primary Examiner* — Nathan Curs
(74) *Attorney, Agent, or Firm* — Leydig, Voit & Mayer, Ltd.

(57) ABSTRACT

The present invention discloses a method for assigning and processing a label in an optical network. The method includes: learning that a label switched path is required to be established in an optical network; generating a label, in which the label is used for indicating that a first optical channel data unit is multiplexed to a second optical channel data unit; the label includes a tributary slot type indication field that is used for indicating a tributary slot type of the second optical channel data unit, and the label further
(Continued)

includes a tributary slot assignment indication field that is used for indicating a tributary slot occupied in the second optical channel data unit into which the first optical channel data unit is multiplexed; and sending the label to a node on the label switched path by a signaling message of GMPLS.

10 Claims, 6 Drawing Sheets

Related U.S. Application Data continuation of application No. 13/342,695, filed on Jan. 3, 2012, now Pat. No. 8,971,711, which is a continuation of application No. PCT/CN2010/074760, filed on Jun. 30, 2010.

(51) Int. Cl.
    *H04J 3/16*     (2006.01)
    *H04L 12/927*     (2013.01)
    *H04L 12/723*     (2013.01)

(52) U.S. Cl.
    CPC .............. *H04L 45/50* (2013.01); *H04L 47/80* (2013.01); *H04Q 2011/0077* (2013.01); *H04Q 2011/0086* (2013.01)

(56) References Cited

U.S. PATENT DOCUMENTS

| | | |
|---|---|---|
| 2004/0213282 A1 | 10/2004 | Kirk et al. |
| 2007/0116462 A1 | 5/2007 | Peloso et al. |
| 2008/0080860 A1* | 4/2008 | Katagiri ................ H04J 3/1664 398/43 |
| 2008/0095171 A1 | 4/2008 | Kim et al. |
| 2008/0107418 A1 | 5/2008 | Zhang |
| 2008/0273473 A1 | 11/2008 | Xu |
| 2008/0317465 A1 | 12/2008 | Yu |
| 2009/0016373 A1 | 1/2009 | Kimura et al. |
| 2010/0054731 A1* | 3/2010 | Oltman ................ H04J 3/14 398/1 |
| 2010/0272438 A1* | 10/2010 | Conklin ................ H04J 3/1652 398/58 |
| 2012/0148240 A1* | 6/2012 | Ceccarelli ............. H04L 45/50 398/45 |

FOREIGN PATENT DOCUMENTS

| | | |
|---|---|---|
| CN | 1972522 A | 5/2007 |
| CN | 101388838 A | 3/2009 |
| EP | 0569960 A2 | 11/1993 |
| EP | 1463370 A1 | 9/2004 |
| EP | 1613123 A1 | 1/2006 |
| RU | 77527 U1 | 10/2008 |
| WO | WO 2007035426 A1 | 3/2007 |

OTHER PUBLICATIONS

1st Office Action in corresponding U.S. Appl. No. 13/342,695 (May 2, 2014).

* cited by examiner

FIG. 1

| 0 0 0 1 | 0 0 1 0 | 0 0 | Reserved Reserved | 1 0 0 1 0 0 0 0 | Reserved Reserved |

| 0 0 0 1 | 0 0 1 1 | 0 0 | Reserved Reserved | 1 0 0 1 0 0 0 0 0 0 0 0 0 0 0 0 |
| 0 0 0 0 | 0 0 0 0 | 0 0 | 0 0 0 0 0 0 | Reserved Reserved |

FIG. 6

| 0 0 0 1 | 0 0 1 0 | 0 0 | Reserved Reserved | 0 1 0 1 0 0 0 0 | Reserved Reserved |

METHOD FOR ASSIGNING AND PROCESSING A LABEL IN AN OPTICAL NETWORK, OPTICAL COMMUNICATION DEVICE, AND OPTICAL COMMUNICATION SYSTEM

CROSS-REFERENCE TO RELATED APPLICATIONS

This application is a continuation application of U.S. patent application Ser. No. 14/616,345, filed on Feb. 6, 2015, which is a continuation application of U.S. patent application Ser. No. 13/342,695, filed on Jan. 3, 2012, now U.S. Pat. No. 8,971,711, which is a continuation of International Patent Application No. PCT/CN2010/074760, filed Jun. 30, 2010. The International Patent Application claims priority to Chinese Patent Application No. 200910150111.X, filed Jul. 3, 2009. The afore-mentioned patent applications are hereby incorporated by reference in their entireties.

FIELD OF THE INVENTION

The present invention relates to the field of optical communication technology, and in particular, to a method for assigning and processing a label in an optical network, an optical communication device, and an optical communication system.

BACKGROUND OF THE INVENTION

The optical transport network (OTN, Optical Transport Network) technology is a new optical transport technology, which is capable of implementing flexible scheduling and management of high-capacity services, and already becomes a mainstream technology of a backbone transport network currently.

Three signal types are defined in the existing OTN: an optical channel data unit 1 (ODU1, Optical Channel Data Unit 1), an ODU2, and an ODU3, which respectively include 1, 4, and 16 tributary slots, and the types of the tributary slots are all 2.5 Gb/s. During the data transmission of the optical network, multiplexing or mapping relationships of related transport units are involved, so that when a transmission path is being established, it is required to designate how an ODUj is multiplexed to an ODUk (j<k), or how the ODUj is mapped to an optical channel transport unit OTUk (Optical Channel Transport Unit) (j=k). In the prior art, a method for assigning labels for neighboring nodes is usually adopted to designate the multiplexing or mapping relationships. An ODU label is disclosed in the prior art, which mainly includes: a t1 field, a t2 field, and a t3 field, so different signal types, for example, an ODU1 signal, an ODU2 signal or an ODU3 signal, are denoted through different values of the t1 field, the t2 field, and the t3 field, and a tributary slot occupied during multiplexing is denoted.

During the research and implementation of the method, the inventors of the present invention find that:

Currently, new ODU signal types, such as an ODU0 suitable for transporting low-rate signals, an ODU4 suitable for transport at a higher rate, and an ODU2e, an ODU3e1, an ODU3e2, and a bandwidth-variable ODUflex, are proposed in the industry. In addition, a new tributary slot type with the bandwidth 1.25 Gb/s is further proposed. However, in the prior art, the label only supports the three signal types: the ODU1, the ODU2, and the ODU3, and at the same time only supports a tributary slot type of 2.5 Gb/s. Also, the label in the prior art has poor expandability and is unable to support new signal types and tributary slot types by extension. Therefore, the prior art is unable to assign a label in an OTN network that supports new signal types and tributary slot types.

SUMMARY OF THE INVENTION

Embodiments of the present invention provide a method for assigning and processing a label in an optical network, an optical communication device, and an optical communication system, capable of assigning labels for an OTN network supporting different signal types and tributary slot types.

An embodiment of the present invention provides a method for assigning and processing a label in an optical network, which includes:

learning that a label switched path is required to be established in an optical network;

generating a label according to a signal type of the label switched path and network resources, in which the label is used for indicating that a first optical channel data unit is multiplexed to a second optical channel data unit; the label includes a tributary slot type indication field that is used for indicating a tributary slot type of the second optical channel data unit, and the label further includes a tributary slot assignment indication field that is used for indicating a tributary slot occupied in the second optical channel data unit into which the first optical channel data unit is multiplexed; and sending the label to a node on the label switched path by a signaling message of General Multi-Protocol Label Switching.

An embodiment of the present invention provides a method for assigning and processing a label in an optical network, which includes:

obtaining a label by a signaling message of General Multi-Protocol Label Switching, in which the label is used for indicating that a first optical channel data unit is multiplexed to a second optical channel data unit; the label includes a tributary slot type indication field that is used for indicating a tributary slot type of the second optical channel data unit, and the label further includes a tributary slot assignment indication field that is used for indicating a tributary slot occupied in the second optical channel data unit into which the first optical channel data unit is multiplexed; and multiplexing the first optical channel data unit to the second optical channel data unit according to field information in the label.

An embodiment of the present invention provides a method for assigning and processing a label in an optical network, which includes:

learning that a label switched path is required to be established in an optical network;

generating a label according to a signal type of the label switched path and network resources, in which the label is used for indicating that an optical channel data unit is mapped to an optical channel transport unit; the label includes a first signal type indication field that is used for indicating a signal type of the optical channel data unit; and the label further includes a second signal type indication field that is used for indicating a signal type of the optical channel transport unit; and sending the label to a node on the label switched path by a signaling message of General Multi-Protocol Label Switching.

An embodiment of the present invention provides a method for assigning and processing a label in an optical network, which includes:

obtaining a label by a signaling message of General Multi-Protocol Label Switching, in which the label is used for indicating that an optical channel data unit is mapped to an optical channel transport unit; the label includes a first signal type indication field that is used for indicating a signal type of the optical channel data unit; and the label further includes a second signal type indication field that is used for indicating a signal type of the optical channel transport unit; and mapping the first optical channel data unit to the second optical channel data unit according to field information in the label.

An embodiment of the present invention provides an optical communication device, which includes:

a processing unit, configured to learn that a label switched path is required to be established in an optical network; and generate a label according to a signal type of the label switched path and network resources, in which the label is used for indicating that a first optical channel data unit is multiplexed to a second optical channel data unit; the label includes a tributary slot type indication field that is used for indicating a tributary slot type of the second optical channel data unit, and the label further includes a tributary slot assignment indication field that is used for indicating a tributary slot occupied in the second optical channel data unit into which the first optical channel data unit is multiplexed; and a sending unit, configured to send the label to a node on the label switched path by a signaling message of General Multi-Protocol Label Switching.

An embodiment of the present invention provides an optical communication device, which includes:

a processing unit, configured to learn that a label switched path is required to be established in an optical network, and generate a label according to a signal type of the label switched path and network resources, in which the label is used for indicating that an optical channel data unit is mapped to an optical channel transport unit, the label includes a first signal type indication field that is used for indicating a signal type of the optical channel data unit; and the label further includes a second signal type indication field that is used for indicating a signal type of the optical channel transport unit; and a sending unit, configured to send the label to a node on the label switched path by a signaling message of General Multi-Protocol Label Switching.

An embodiment of the present invention provides an optical communication device, which includes:

an obtaining unit, configured to obtain a label by a signaling message of General Multi-Protocol Label Switching, in which the label is used for indicating that a first optical channel data unit is multiplexed to a second optical channel data unit; the label includes a tributary slot type indication field that is used for indicating a tributary slot type of the second optical channel data unit, and the label further includes a tributary slot assignment indication field that is used for indicating a tributary slot occupied in the second optical channel data unit into which the first optical channel data unit is multiplexed; and a multiplexing unit, configured to multiplex the first optical channel data unit to the second optical channel data unit according to field information in the label.

An embodiment of the present invention provides an optical communication device, which includes:

an obtaining unit, configured to obtain a label by a signaling message of General Multi-Protocol Label Switching, in which the label is used for indicating that an optical channel data unit is mapped to an optical channel transport unit; the label includes a first signal type indication field that is used for indicating a signal type of the optical channel data unit; and the label further includes a second signal type indication field that is used for indicating a signal type of the optical channel transport unit; and a mapping unit, configured to map the optical channel data unit into the optical channel transport unit according to field information in the label.

An embodiment of the present invention provides an optical communication system, which includes:

a first optical communication device, configured to learn that a label switched path is required to be established in an optical network; generate a label according to a signal type of the label switched path and network resources, in which the label is used for indicating that a first optical channel data unit is multiplexed to a second optical channel data unit; the label includes a tributary slot type indication field that is used for indicating a tributary slot type of the second optical channel data unit, and the label further includes a tributary slot assignment indication field that is used for indicating a tributary slot occupied in the second optical channel data unit into which the first optical channel data unit is multiplexed; and send the label to a node on the label switched path by a signaling message of General Multi-Protocol Label Switching; and a second optical communication device, configured to obtain the label by the signaling message of General Multi-Protocol Label Switching sent by the first optical communication device, and multiplex the first optical channel data unit to the second optical channel data unit according to field information in the label.

An embodiment of the present invention provides an optical communication system, which includes:

a first optical communication device, configured to learn that a label switched path is required to be established in an optical network; generate a label according to a signal type of the label switched path and network resources, in which the label is used for indicating that an optical channel data unit is mapped to an optical channel transport unit; the label includes a first signal type indication field that is used for indicating a signal type of the optical channel data unit, and the label further includes a second signal type indication field that is used for indicating a signal type of the optical channel transport unit; and send the label to a node on the label switched path by a signaling message of General Multi-Protocol Label Switching; and a second optical communication device, configured to obtain the label by the signaling message of General Multi-Protocol Label Switching sent by the first optical communication device, and map the optical channel data unit into the optical channel transport unit according to field information in the label.

It can be seen from the technical solutions that, the generated label in the embodiments of the present invention is used for indicating that the first optical channel data unit is multiplexed to the second optical channel data unit, the label includes a tributary slot type indication field that is used for indicating a tributary slot type of the second optical channel data unit, and the label further includes a tributary slot assignment indication field that is used for indicating a tributary slot occupied in the second optical channel data unit into which the first optical channel data unit is multiplexed. In this way, both the original and new signal types, and original and new tributary slot types can be supported by the generated label in the embodiments of the present invention, and therefore labels may be assigned for an OTN network supporting different signal types and tributary slot types.

DETAILED DESCRIPTION OF THE EMBODIMENTS

An embodiment of the present invention provides a method for assigning and processing a label in an optical network, which is capable of assigning labels for an OTN network supporting different signal types and tributary slot types. An embodiment of the present invention further provides a corresponding optical communication device and optical communication system. The detailed illustrations are provided in the following.

Figure 1:
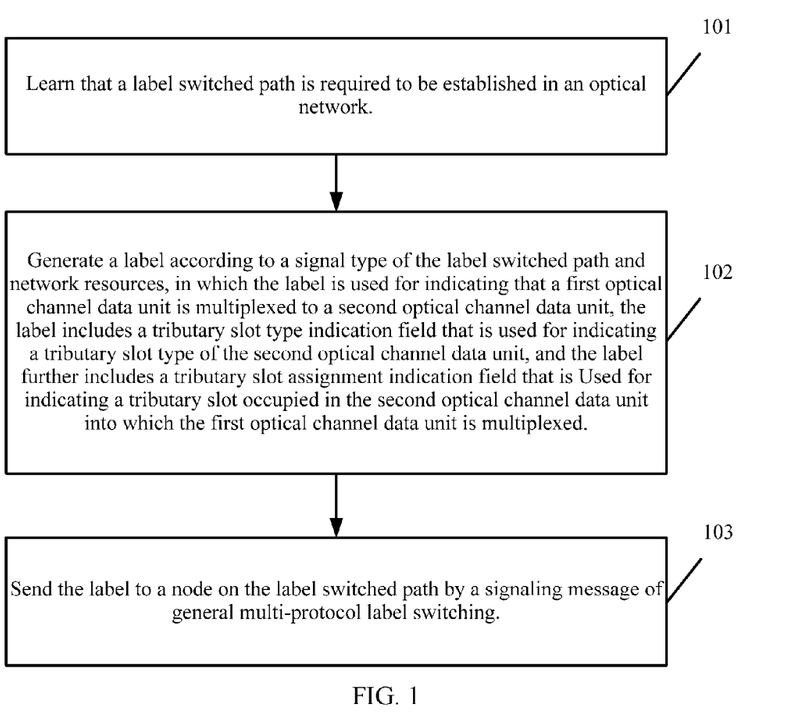
FIG. 1 is a flow chart of a method for assigning and processing a label in an optical network according to Embodiment 1 of the present invention.

FIG. 1 is a flow chart of a method for assigning and processing a label in an optical network according to Embodiment 1 of the present invention, which mainly includes the following steps:

Step 101: Learn that a label switched path is required to be established in an optical network.

Step 102: Generate a label according to a signal type of the label switched path and network resources, in which the label is used for indicating that a first optical channel data unit is multiplexed to a second optical channel data unit, the label includes a tributary slot type indication field that is used for indicating a tributary slot type of the second optical channel data unit, and the label further includes a tributary slot assignment indication field that is used for indicating a tributary slot occupied in the second optical channel data unit into which the first optical channel data unit is multiplexed.

The tributary slot assignment indication field uses a set value at a different bit to indicate the tributary slot occupied in the first optical channel data unit into which the second optical channel data unit is multiplexed.

Step 103: Send the label to a node on the label switched path by a signaling message of general multi-protocol label switching (GMPLS, General Multi-Protocol Label Switching).

It should be noted that the label further includes a first signal type indication field that is used for indicating a signal type of the first optical channel data unit; and a second signal type indication field that is used for indicating a signal type of the second optical channel data unit.

The label further includes a length field that is used for indicating a length of the tributary slot assignment indication field.

The length of the tributary slot assignment indication field is equal to the number of tributary slots of the second optical channel data unit.

In addition, when one label exists, the label is generated by one node on the label switched path; and the node sends the label to an upstream neighboring node of the node or a downstream neighboring node of the node on the label switched path by the signaling message.

Alternatively, when multiple labels exist, a label is generated by a head node on the label switched path for each of multiple downstream nodes of the head node on the label switched path; and the head node sends the label to each of the multiple downstream nodes by the signaling message.

It can be seen from the content of the embodiment that, the generated label in the embodiment of the present invention is used for indicating that the first optical channel data unit is multiplexed to the second optical channel data unit, the label includes a tributary slot type indication field that is used for indicating a tributary slot type of the second optical channel data unit, and the label further includes a tributary slot assignment indication field that is used for indicating a tributary slot occupied in the second optical channel data unit into which the first optical channel data unit is multiplexed. In this way, both the original and new signal types and the original and new tributary slot types can be supported by the generated label in the embodiments of the present invention, and therefore labels may be assigned for an OTN network supporting different signal types and tributary slot types.

Figure 2:
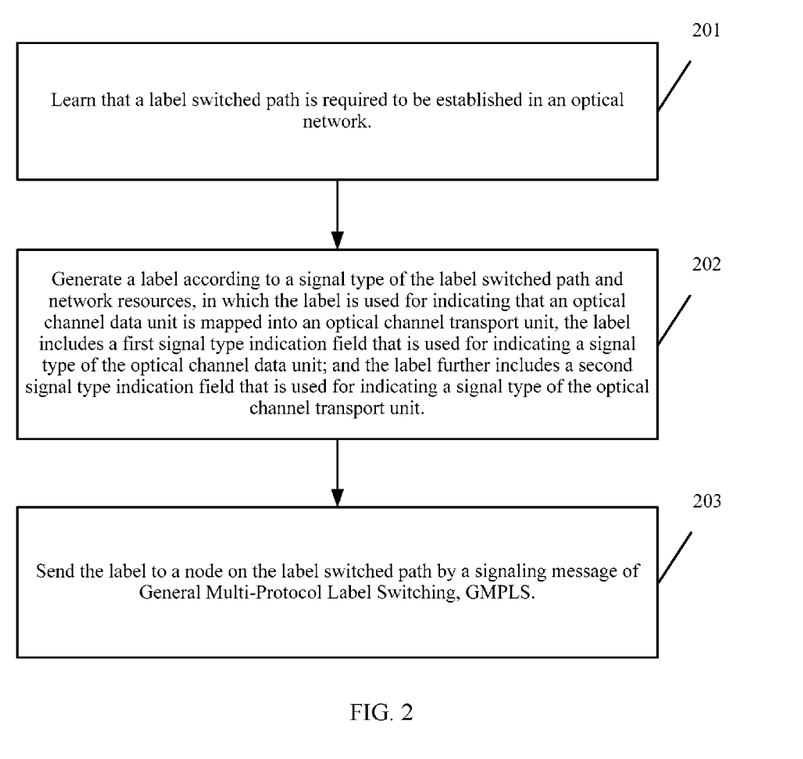
FIG. 2 is a flow chart of a method for assigning and processing a label in an optical network according to Embodiment 2 of the present invention.

FIG. 2 is a flow chart of a method for assigning and processing a label in an optical network according to Embodiment 2 of the present invention, which mainly includes the following steps:

Step 201: Learn that a label switched path is required to be established in an optical network.

Step 202: Generate a label according to a signal type of the label switched path and network resources, in which the label is used for indicating that an optical channel data unit is mapped into an optical channel transport unit, the label includes a first signal type indication field that is used for indicating a signal type of the optical channel data unit; and the label further includes a second signal type indication field that is used for indicating a signal type of the optical channel transport unit.

Step 203: Send the label to a node on the label switched path by a signaling message of General Multi-Protocol Label Switching, GMPLS.

It can be seen from the content of the embodiment that, the generated label in the embodiments of the present invention is used for indicating that the optical channel data unit is mapped to the optical channel transport unit, the label includes a first signal type indication field that is used for indicating a signal type of the optical channel data unit; second signal type indication field that is used for indicating a signal type of the optical channel transport unit. In this way, both the original and new signal types and the original and new tributary slot types can be supported by the generated label in the embodiments of the present invention, and therefore labels may be assigned for an OTN network supporting different signal types and tributary slot types.

The embodiments of the present invention are illustrated in further detail in the following.

The label disclosed in the embodiment of the present invention is first introduced.

Figure 3:
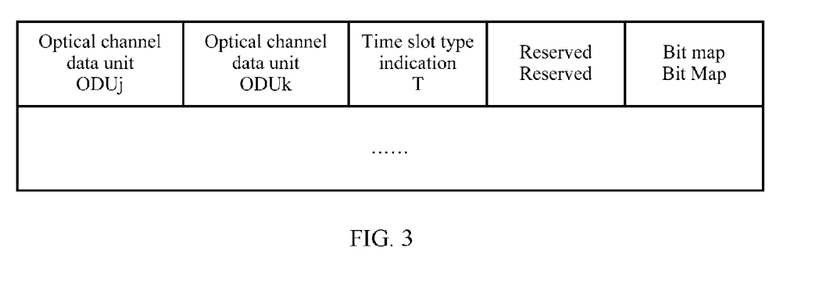
FIG. 3 is a schematic structural diagram of a label according to an embodiment of the present invention.

FIG. 3 is a schematic structural diagram of a label according to an embodiment of the present invention.

For illustration, the label in FIG. 3 is used for indicating that a first optical channel data unit is multiplexed to a second optical channel data unit. The first optical channel data unit is, for example, an ODUj (j=0, 1, 2, 3, 4, 2e, 3e1, 3e2, and flex), and the second optical channel data unit, is for example, an ODUk (k=1, 2, 3, and 4).

As shown in FIG. 3, an ODUj field, an ODUk field, a T field, and a bit map Bit Map field are mainly included.

The T field is a tributary slot type indication field that is used for indicating a tributary slot type of a second optical channel data unit, for example, indicating a tributary slot type of the ODUk. The bit map Bit Map field is a tributary slot assignment indication field that is used for indicating a tributary slot occupied in the second optical channel data unit into which the first optical channel data unit is multiplexed, for example, indicating a tributary slot occupied in the ODUk into which the ODUj is multiplexed. The ODUj field is a first signal type indication field that is used for indicating a signal type of the first optical channel data unit. The ODUk field is a second signal type indication field that is used for indicating a signal type of the second optical channel data unit. The ODUj field and the ODUk field (both can occupy 4 bits) denote that the ODUj is multiplexed to the ODUk (j=0, 1, 2, 3, 4, 2e, 3e1, 3e2, and flex, k=1, 2, 3, and 4, and the bandwidth of the ODUj is smaller than that of the ODUk).

It should be noted that if the label indicates that the optical channel data unit is mapped to the optical channel transport unit, the label includes only the ODUj field and the OTUk field (both can occupy 4 bits, and j=k=1, 2, 3, and 4).

For example, the values of the related fields may be as shown in Table 1:

TABLE 1

| Values | Signal Type Indicated By the ODUj | Signal Type Indicated By the ODUk or OTUk |
| --- | --- | --- |
| 0 | ODU0 | Reserved for use in future extension |
| 1 | ODU1 | ODU1 or OTU1 |

TABLE 1-continued

| Values | Signal Type Indicated By the ODUj | Signal Type Indicated By the ODUk or OTUk |
| --- | --- | --- |
| 2 | ODU2 | ODU2 or OTU2 |
| 3 | ODU3 | ODU3 or OTU3 |
| 4 | ODU4 | ODU4 or OTU4 |
| 5 | ODU2e | Reserved for use in future extension |
| 6 | ODU3e1 | Reserved for use in future extension |
| 7 | ODU3e2 | Reserved for use in future extension |
| 8 | ODUflex | Reserved for use in future extension |
| Others | Reserved for use in future extension | Reserved for use in future extension |

For example, ODUj=2, ODUk=4, which denote that the ODU2 is multiplexed to the ODU4; and ODUj=2, OTUk=2, which denote that the ODU2 is mapped to the OTU2.

T (which can occupy 2 bits) denotes a tributary slot type. For example, T=0, which denotes that the tributary slot type is 1.25 Gb/s, and T=1, which denotes that the tributary slot type is 2.5 Gb/s.

The Bit Map denotes into which tributary slots of the ODUk the ODUj is multiplexed. A length of the Bit Map is equal to the number of tributary slots of the ODUk. When an nth bit of the Bit Map is filled with "1", it denotes that the ODUj is multiplexed to an nth tributary slot of the ODUk. The total number of tributary slots of all ODU signals is shown in Table 2:

TABLE 2

| ODU Signal | Total Number of Time Slots of 1.25 Gb/s | Total Number of Time Slots of 2.5 Gb/s |
| --- | --- | --- |
| ODU1 | 2 | 1 |
| ODU2 | 8 | 4 |
| ODU3 | 32 | 16 |
| ODU4 | 80 | 40 |

It should be noted that, theoretically, the ODU4 can be divided into 40 tributary slots with the granularity of 2.5 Gb/s. However, the ODU4 defined by the existing OTN standard does not support the division of the granularity of 2.5 Gb/s.

In addition, when the label indicates that the ODUj is mapped to the OTUk (j=k), the Bit Map is null because it is not required to specify which tributary slots are used.

Figure 4:
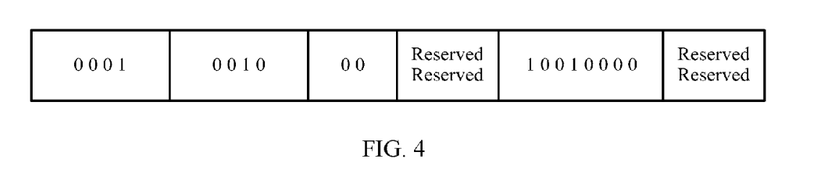
FIG. 4 is a schematic diagram of an example of a label according to an embodiment of the present invention.

One example of the label is introduced in the following. FIG. 4 is a schematic diagram of an example of a label according to an embodiment of the present invention.

As shown in FIG. 4, ODUj=1, ODUk=2, denoting that the label indicates that an ODU1 is multiplexed to an ODU2.

T=0, which denotes that the tributary slot type is 1.25 Gb/s, so the ODU2 has 8 tributary slots in total, and the ODU1 needs to occupy 2 tributary slots of the ODU2.

The first 1 bit and the fourth bit of the Bit Map are "1", which denotes that the ODU1 is multiplexed to the first tributary slot and the fourth tributary slot of the ODU2.

Reserved refers to a reserved field for use in future extension.

It should be noted that the label disclosed in the embodiment of the present invention may also not explicitly point out the ODUj field and the ODUk field, that is because the node may also learn the signal type of the ODUj according to a traffic parameter in the received signaling message. In addition, the label is related to a port, and the node may learn a signal type of the ODUk through a port attribute. Therefore, the two fields are not mandatory, but when the ODUj field and the ODUk field are explicitly pointed out, the processing on the control plane becomes more convenient. Moreover, the label may further adopt a Length field to explicitly point out the length of the Bit Map.

In addition, when a low-rate ODUj is multiplexed to a high-rate ODUk, for example, the ODU0 or the ODU1 is multiplexed to the ODU4, because the number of tributary slots of the ODUk is large, and the number of tributary slots of the ODUk occupied by the ODUj is small, in this case, in the Bit Map field of the label, many bits with the value 0 exist, and at this time, a bit map compression method may be adopted to reduce the length of the label. The specific compression method is that in the label format in FIG. 3, one bit is selected from the reserved (Reserved) field to denote whether the label adopts the bit map compression method (for example, when the bit is 1, it denotes that the bit map of the label is compressed, and 0 denotes that no compression occurs). In the compressed part of the bit map, every 8 bits denote a specific position of one tributary slot of an ODUk occupied by the ODUj, for example, when a value of a number formed of 8 bits is n, it denotes that the ODUj occupies the nth tributary slot of the ODUk. If the ODUj needs to occupy multiple tributary slots of the ODUk, the compressed part of the bit map includes a plurality of 8 bits.

In addition, it should be noted that in the case of how the ODUj is mapped to the OTUk (j=k), the disclosed label may need to include only the ODUj field and the OTUk field (j=k), and does not need the T field and the Bit Map field.

The label disclosed in the embodiment of the present invention is introduced in detail, and the method according to the embodiment of the present invention may be applied in an OTN network controlled by the GMPLS, so that in the following content, the processing process of assigning a label according to an embodiment of the present invention is introduced by taking the application scenario in which a label is assigned in a network to establish one label switched path (LSP, Label Switched Path) of the ODUj. The following embodiments mainly include a method for assigning a label downstream, a method for assigning a label upstream, and a method for globally and explicitly assigning a label, which respectively correspond to Embodiment 3 to Embodiment 5.

Embodiment 3

Embodiment 3 is about a method for assigning a label downstream, and assigning a label downstream is the most basic method for assigning a label in the GMPLS. The method is mainly: starting sending a path message (Path message) from a source node to a destination node hop by hop, requesting establishment of an LSP of a certain type; reserving, by the destination node, according to network resources, resources and assigning a label, and sending a reservation (Resv, Reservation) message to an upstream node, in which the message carries a label, and the label indicates which resources are reserved specifically. Each intermediate node repeats the foregoing actions till the source node.

An example is provided in the following. It is assumed that a link between a node A and a node B is of an ODU2 type, and a link between the node B and a node C is of an ODU3 type, and the tributary slot types are both 1.25 Gb/s. The source node is the node A and the destination node is the node C. Now, a client layer requires a service layer to establish a path of an ODU1 type between the nodes A-C. It is assumed that the node A already calculates a route (A-B-C), and the resource reservation protocol-traffic engineering (RSVP-TE, Resource ReserVation Protocol-Traffic Engineering) extended from the GMPLS is adopted, and other protocols, for example, a label distribution protocol (LDP, Label Distribution Protocol may also be adopted, and the process is similar). For the process of establishing the LSP, refer to FIG. 5.

Figure 5:
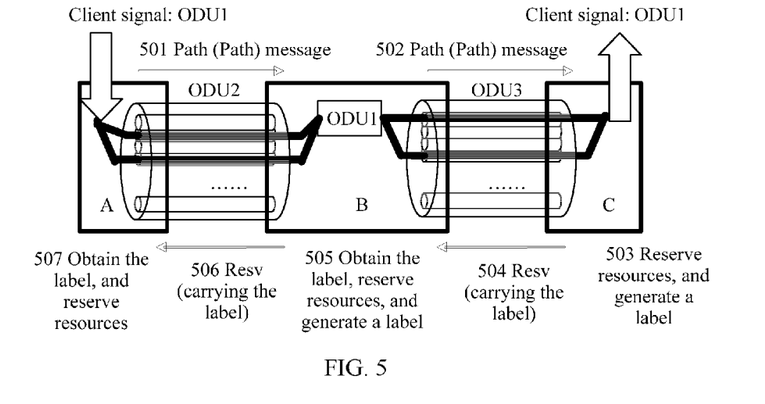
FIG. 5 is a schematic diagram of a process of assigning a label to establish an LSP according to Embodiment 3 of the present invention.

FIG. 5 is a schematic diagram of a process of assigning a label to establish an LSP according to Embodiment 3 of the present invention, which mainly includes the following steps:

Step 501: The node A sends a Path message to the node B, in which the message carries a traffic parameter designating that one LSP of the ODU1 type needs to be established.

Step 502: The node B sends the Path message to the node C, in which the message carries the traffic parameter designating that one LSP of the ODU1 type needs to be established.

Step 503: The node C is a destination node, and according to the received Path message, learns that one LSP of the ODU1 type needs to be established, and therefore learns that a label needs to be assigned, and reserves resources for the LSP that needs to be established and generates a corresponding label.

The node C selects and reserves resources for an ingress port (a direction B-C). For example, because the node C finds that the first and fourth tributary slots on the link BC are currently free, the node C selects and reserves the two tributary slots, and then generates and saves a label L (B, C) in a direction of the ingress port. The format of the generated label is as shown in FIG. 6.

Figure 6:
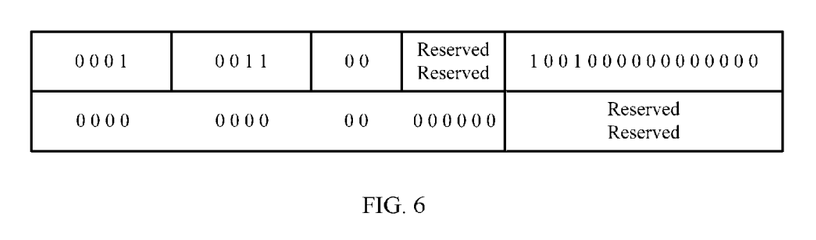
FIG. 6 is a schematic diagram of a label 1 assigned in Embodiment 3.

FIG. 6 is a schematic diagram of a label 1 assigned in Embodiment 3.

ODUj=1, and ODUk=3, which denote that the ODU1 is multiplexed to the ODU3, and T=0, which denotes that a tributary slot type is 1.25 Gb/s. Because the ODU3 has 32 tributary slots of the 1.25 Gb/s type, the Bit Map has 32 bits, in which the first and fourth bits are 1, which denotes that the node C has reserved the first and fourth tributary slots of the ODU3, that is, the ODU1 is to be multiplexed to the first and fourth tributary slots of the ODU3.

Step 504: The node C sends a Resv message to the node B, in which the message carries the generated label L (B, C).

Step 505: When receiving the Resv message, the node B reserves resources for an LSP to be established and generates a corresponding label.

The node B performs the following operations:

(1) By analyzing the label L (B, C), resources (that is, the first and fourth tributary slots in an egress port) of an egress port of the node B to be used by the ODU1 service may be learned. The node B records the label L (B, C) locally and reserves the resources of the egress port for an ODU1 service.

(2) The node B selects and reserves the resources of the ingress port (a direction A-B). For example, B finds that the second and fourth tributary slots on the link AB are currently free, and therefore selects and reserves the two tributary slots and then generate a label L (A, B) in a direction of the ingress port. The format of the generated label is as shown in FIG. 7.

Figure 7:
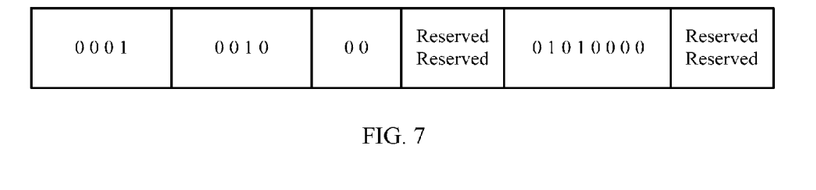
FIG. 7 is a schematic diagram of a label 2 assigned in Embodiment 3.

FIG. 7 is a schematic diagram of a label 2 assigned in Embodiment 3.

ODUj=1, and ODUk=2, which denote that the ODU1 is multiplexed to the ODU2, and T=0, which denotes that a tributary slot type is 1.25 Gb/s. Because the ODU2 has 8 tributary slots of the 1.25 Gb/s type, the Bit Map has 8 bits, in which the second and fourth bits are 1, which denotes that the node B has reserved the second and fourth tributary slots of the ODU2, that is, the ODU1 is to be multiplexed to the second and fourth tributary slots of the ODU2.

(3) A control plane of the node B delivers a command to a data plane, and establishes a cross-connection from the ingress port to the egress port.

It should be noted that the process is not a mandatory process, and in some special scenarios, the cross-connection may be not established. For example, when a shared recovery path is being established, it can be specified that a label is assigned on a control plane only, and the cross-connection is established for the recovery path only when a failure occurs on a work path.

Step 506: The node B sends a Resv message to the node A, in which the message carries the label L (A, B).

Step 507: When receiving the Resv message, the node A may learn resources (that is, the second and fourth tributary slots in the egress port) of an egress port of a node A to be used by the ODU1 service by analyzing the label L (A, B). The node A records the label locally and reserves resources of the egress port for the ODU1 service.

Through the foregoing process, the LSP on the service layer is successfully established by using the assigned label. During the service transport, the node A may, according to the locally saved label L (A, B), multiplex the ODU1 to the second and fourth tributary slots of the ODU2 and transport to the node B. The node B, according to the locally saved label L (A, B) in the direction of the ingress port, receives the ODU1 from the second and fourth tributary slots of the ODU2, and according to the locally saved label L (B, C) in the direction of the egress port, multiplexes the ODU1 to the first and fourth tributary slots of the ODU3 and transports to the node C. The node C, according to the locally saved label L (B, C) in the direction of the ingress port, and receives the ODU1 from the first and fourth tributary slots of the ODU3, so as to implement the service transport process.

It can be seen that the generated label in the embodiments of the present invention includes an ODUj field, an ODUk field, a T field, and a bit map Bit Map field, and additionally the method for assigning a label downstream is adopted. In this way, both the original and new signal types and the original and new tributary slot types can be supported by the generated label in the embodiments of the present invention, and therefore labels may be assigned for an OTN network supporting different signal types and tributary slot types.

Embodiment 4

Embodiment 4 is about a method for assigning a label upstream. In the GMPLS, it is further allowed that an upstream node assigns a label to a downstream node. The method is mainly: starting sending a Path message from a source node to a downstream node hop by hop, requesting establishment of an LSP, in which the message carries a label, and the label indicates which resources are specifically reserved. The downstream node judges whether the resources corresponding to the label are available, and, if yes, continues to send the Path message downstream till the destination node.

An example is provided in the following. It is assumed that a link between a node A and a node B is of an ODU2 type, a link between the node B and a node C is of an ODU3 type, and the tributary slot type is 1.25 Gb/s. Now, a client layer requires a service layer to establish a path of an ODU1 type between the node A and the node C. It is assumed that the node A already calculates a route (A-B-C). For the process of establishing the LSP, refer to FIG. 8.

Figure 8:
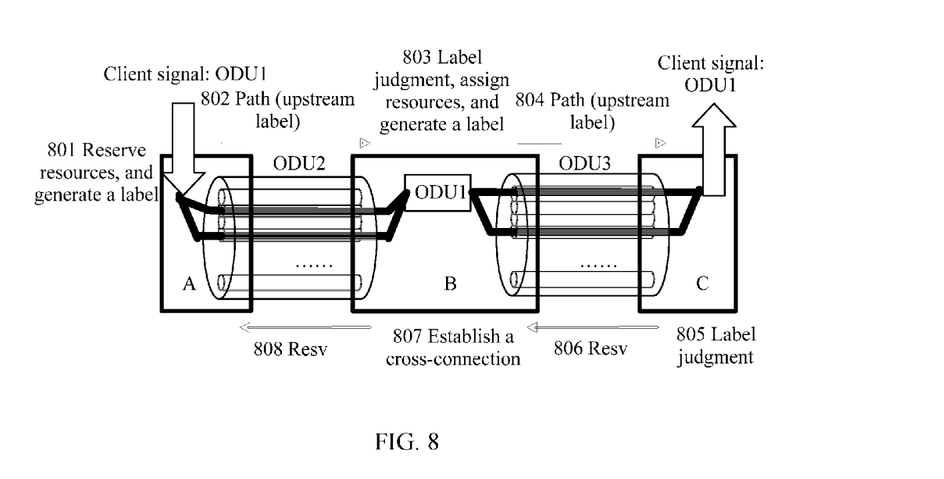
FIG. 8 is a schematic diagram of a process of assigning a label to establish an LSP according to Embodiment 4 of the present invention.

FIG. 8 is a schematic diagram of a process of assigning a label to establish an LSP according to Embodiment 4 of the present invention, which mainly includes the following steps:

Step 801: The node A reserves resources for an LSP to be established and generates a corresponding label.

The node A selects and reserves resources of an egress port (a direction A-B). For example, the node A finds that the second and fourth tributary slots on the link AB are free, and therefore selects the two tributary slots to carry the ODU1 service. The node A generates an upstream label L (A, B) to indicate the resources assigned by the node A, and saves the label locally.

The content of the label generated by the node A is the same as that of the label generated by the node B in Embodiment 3. For details, refer to the preceding description.

Step 802: The node A sends a Path message to the downstream node B, in which the message carries a traffic parameter (used for indicating that an LSP of an ODU1 type needs to be established) and the label L (A, B).

Step 803: When receiving the Path message, the node B reserves resources for the LSP to be established and generates a corresponding label.

The node B performs the following operations:

(1) The node B retrieves the upstream label L (A, B), and then judges whether the resources on a corresponding ingress port (that is, the second and fourth tributary slots of the ODU2 link) are available, and if available, records the label L (A, B) locally.

(2) The node B selects and assigns resources of the egress port. For example, the node B finds that the first and fourth tributary slots on the link BC are free, and therefore selects the two tributary slots to carry the ODU1 service. The node B generates an upstream label L (B, C) to indicate resources assigned by the node B, and saves the label locally.

The content of the label generated by the node B is the same as that of the label generated by the node in Embodiment 3. For details, refer to the preceding description.

Step 804: The node B sends a Path message to the downstream node C, in which the message carries a traffic parameter (used for indicating that an LSP of an ODU1 type needs to be established) and the label L (B, C).

Step 805: The node C is a destination node, and when receiving the Path message, retrieves the upstream label L (B, C) from the message, and then judges whether the resources on the ingress port (that is, the first and fourth tributary slots of the ODU3 link) are available. If available, the label is saved locally.

Step 806: The node C returns a Resv message to an upstream node B.

Step 807: When receiving the Resv message, the node B establishes a cross-connection from an ingress port to an egress port.

It should be noted that the process is not a mandatory process, and in some special scenarios, the cross-connection may be not established. For example, when a shared recovery path is being established, it may be specified that a label is assigned on the control plane only, and the cross-connection is established for the recovery path only when a failure occurs on a work path.

Step 808: The node B sends a Resv message to the node A.

Through the foregoing process, the LSP on the service layer is successfully established by using the assigned label, which can therefore be used for carrying the ODU1 service of the client layer. For details, refer to the description in Embodiment 3.

It can be seen that the generated label in the embodiments of the present invention includes an ODUj field, an ODUk field, a T field, and a bit map Bit Map field, and additionally a method for assigning a label upstream is adopted. In this way, both the original and new signal types and the original and new tributary slot types can be supported by the generated label in the embodiments of the present invention, and therefore labels may be assigned for an OTN network supporting different signal types and tributary slot types.

Embodiment 5

Embodiment 5 is mainly about an explicit label control method, which may directly specify what labels each node uses, that is, directly specify which tributary slots are used on each link to transport the ODU service.

An example is provided in the following. It is assumed that a link between a node A and a node B is of an ODU2 type, a link between the node B and a node C is of an ODU3 type, and a tributary slot type is 1.25 Gb/s. Now, the client layer requires the service layer to establish one path of an ODU1 type between A and C. It is assumed that the node A has already learned a route (A-B-C) of an LSP, and has learned that the second and fourth tributary slots of the ODU2 link between A and B are adopted, and the first and fourth tributary slots of the ODU3 link between B and C are adopted. For the process of establishing the LSP, refer to FIG. 9.

Figure 9:
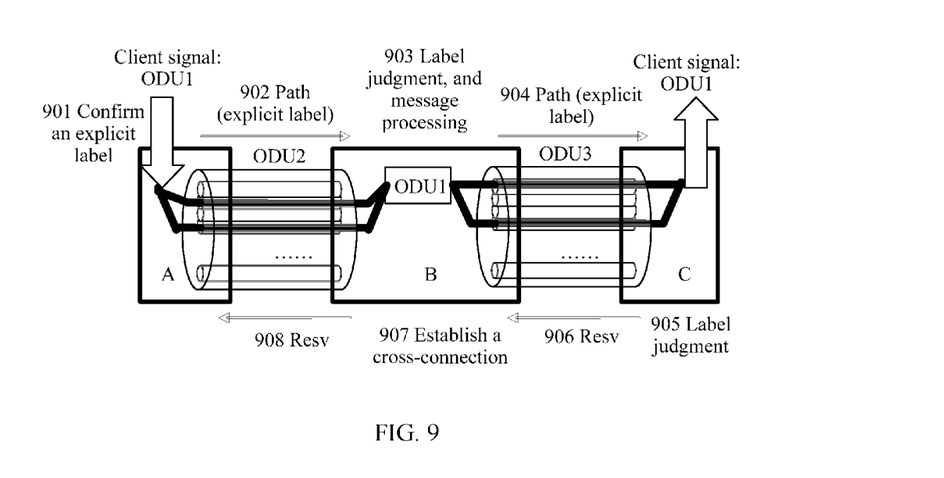
FIG. 9 is a schematic diagram of a process of assigning a label to establish an LSP according to Embodiment 5 of the present invention.

FIG. 9 is a schematic diagram of a process of assigning a label to establish an LSP according to Embodiment 5 of the present invention, which mainly includes the following steps:

Step 901: The node A confirms an explicit label, in which the explicit label includes labels generated by all nodes and reserved related resources.

The node A receives a path establishment command and determines explicit route information and an explicit label. The information may be from a network manager or other network elements of the network side, and may also be obtained by the node A through automatic calculation.

The explicit route information is: the LSP to be established passes through the node A—the link AB—the node B—the link BC—the node C.

Explicit label information is: the label (L (A, B)) from the node A to the node B, and the label (L (B, C)) from the node B to the node C. The two labels have the same content as that in the two foregoing embodiments. For details, refer to the foregoing description.

In addition, the node A further saves an egress port label L (A, B) of A.

Step 902: The node A sends a Path message to the downstream node B, which includes a traffic parameter, an EXPLICIT_ROUTE object (ERO, EXPLICIT_ROUTE object), a Label ERO subobject (Label ERO subobject), and an upstream label.

Multiple Label ERO subobjects may exist and one upstream label exists.

The EXPLICIT_ROUTE object designates that the LSP to be established subsequently passes through "the link AB—the node B—the link BC—the node C", and no longer needs to indicate that "passing through the node A". The Label ERO subobject designates the label (L (B, C)) from the node B to the node C; and the upstream label designates the label (L (A, B)) from the node A to the node B.

Figure 10:
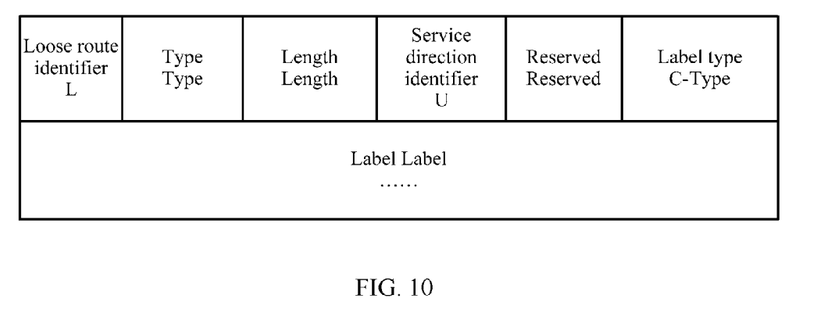
FIG. 10 is a schematic diagram of a format of a Label ERO subobject of a label according to Embodiment 5.

A format of a Label ERO subobject is as shown in FIG. 10.

FIG. 10 is a schematic diagram of a format of a Label ERO subobject of a label in Embodiment 5.

A loose route identifier L field, a type Type field, a length Length field, a service direction identifier U field, a label type C-Type field are the same as those in the prior art, and the label Label field adopts the label disclosed in the embodiment of the present invention.

Step 903: When receiving the Path message, the node B retrieves the upstream label L (A, B) from the message, and then judges whether the resources (the second and fourth tributary slots of the ODU2 link) on a corresponding ingress port are available, and if available, records the label L (A, B) locally.

In addition, the node B further saves the egress port label L (B, C) of B.

Step 904: The node B sends a Path message to the downstream node C, in which the message carries a traffic parameter, an EXPLICIT_ROUTE object, and an upstream label.

The EXPLICIT_ROUTE object designates that the LSP to be established subsequently passes through "link BC—the node C"; and the upstream label designates the label (L (B, C)) from the node B to the node C. The content of the label (L (B, C)) remains unchanged.

It should be noted that, because the node C is already the destination node at this time, the Label ERO subobject is null, and if the node C is not the destination node, the Label ERO subobject is further included.

Step 905: The node C is a destination node. When receiving the Path message, according to the upstream label L (B, C), the node C judges whether the resources on the ingress port (that is, the first and fourth tributary slots of the ODU3 link) are available. If available, the label is locally stored.

Step 906: The node C returns a Resv message to the upstream node B.

Step 907: When receiving the Resv message, the node B establishes a cross-connection from the ingress port to the egress port.

It should be noted that the process is not a mandatory process.

Step 908: The node B sends a Resv message to the node A.

Through the foregoing process, the LSP of the service layer is successfully established by using the assigned label, which therefore can be used for carrying the ODU1 service of the client layer. For details, refer to the description in Embodiment 3.

It can be seen that the generated label in the embodiment of the present invention includes an ODUj field, an ODUk field, a T field, and a bit map Bit Map field, and additionally, an explicit label control method is adopted. In this way, both the original and new signal types and the original and new tributary slot types can be supported by the generated label in the embodiments of the present invention, and therefore labels may be assigned for an OTN network supporting different signal types and tributary slot types.

It should be noted that in the foregoing, the case in which the ODUj is multiplexed to the ODUk is used for illustration. For the process of establishing an LSP in the case that the ODUj is mapped to the OTUk (j=k), the principles are all similar, and only the formats of the generated labels are different.

The content in the foregoing is introduced the processing method of assigning a label according to the embodiments of the present invention in detail, and correspondingly, the embodiments of the present invention provide an optical communication device and an optical communication system.

Figure 11:
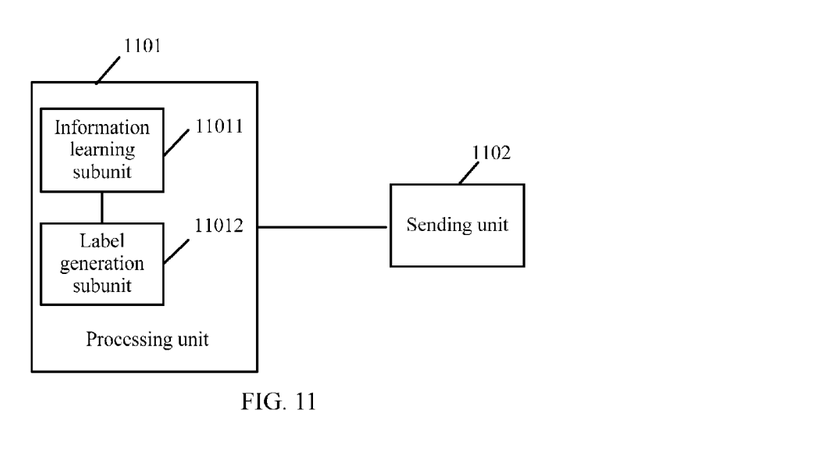
FIG. 11 is a schematic diagram of a structure 1 of an optical communication device according to an embodiment of the present invention.

FIG. 11 is a schematic diagram of a structure 1 of an optical communication device according to an embodiment of the present invention.

As shown in FIG. 11, the optical communication device includes: a processing unit 1101 and a sending unit 1102.

The processing unit 1101 is configured to learn that a label switched path is required to be established in an optical network; and generate a label according to a signal type of the label switched path and network resources, in which the label is used for indicating that a first optical channel data unit is multiplexed to a second optical channel data unit, the label includes a tributary slot type indication field that is used for indicating a tributary slot type of the second optical channel data unit, and the label further includes a tributary slot assignment indication field that is used for indicating a tributary slot occupied in the second optical channel data unit into which the first optical channel data unit is multiplexed.

The sending unit 1102 is configured to send the label to a node on the label switched path by a signaling message of General Multi-Protocol Label Switching.

The processing unit 1101 includes an information learning subunit 11011 and a label generation subunit 11012.

The information learning subunit 11011 is configured to learn that a label switched path is required to be established in an optical network.

The label generation subunit 11012 is configured to generate a label according to a signal type of the label switched path and network resources, in which the label is used for indicating that a first optical channel data unit is multiplexed to a second optical channel data unit; and the label includes: a tributary slot type indication field that is used for indicating a tributary slot type of the second optical channel data unit; a tributary slot assignment indication field that is used for indicating a tributary slot occupied in the second optical channel data unit into which the first optical channel data unit is multiplexed; a first signal type indication field that is used for indicating a signal type of the first optical channel data unit; and a second signal type indication field that is used for indicating a signal type of the second optical channel data unit.

In addition, the label further includes a length field that is used for indicating a length of the tributary slot assignment indication field. The tributary slot assignment indication field uses a set value at a different bit to indicate the tributary slot occupied in the first optical channel data unit into which the second optical channel data unit is multiplexed. A length of the tributary slot assignment indication field is equal to the number of tributary slots of the second optical channel data unit.

When one label exists, the label is generated by the label generation subunit 11012.

The sending unit 1102 sends the label to an upstream neighboring optical communication device of the optical communication device or a downstream neighboring optical communication device of the optical communication device on the label switched path by the signaling message.

Alternatively, when multiple labels exist, a label is generated by the label generation subunit 11012 for each of multiple downstream optical communication devices of the optical communication device on the label switched path.

The sending unit 1102 sends the label to each of the multiple downstream optical communication devices by the signaling message.

Figure 12:
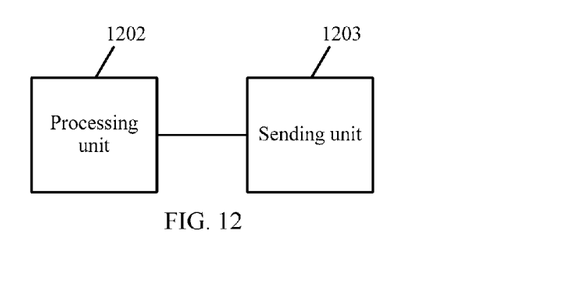
FIG. 12 is a schematic diagram of a structure 2 of an optical communication device according to an embodiment of the present invention.

FIG. 12 is a schematic diagram of a structure 2 of an optical communication device according to an embodiment of the present invention.

As shown in FIG. 12, the optical communication device includes: a processing unit 1202 and a sending unit 1203.

The processing unit 1202 is configured to learn that a label switched path is required to be established in an optical network; and generate a label according to a signal type of the label switched path and network resources, in which the label is used for indicating that an optical channel data unit is mapped to an optical channel transport unit, the label includes a first signal type indication field that is used for indicating a signal type of the optical channel data unit; and the label further includes a second signal type indication field that is used for indicating a signal type of the optical channel transport unit.

The sending unit 1203 is configured to send the label to a node on the label switched path by a signaling message of General Multi-Protocol Label Switching.

Figure 13:
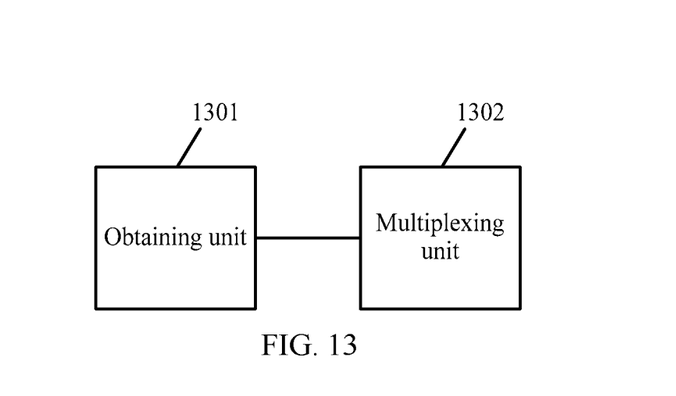
FIG. 13 is a schematic diagram of a structure 3 of an optical communication device according to an embodiment of the present invention.

FIG. 13 is a schematic diagram of a structure 3 of an optical communication device according to an embodiment of the present invention.

As shown in FIG. 13, the optical communication device includes: an obtaining unit 1301 and a multiplexing unit 1302.

The obtaining unit 1301 is configured to obtain a label by a signaling message of General Multi-Protocol Label Switching, in which the label is used for indicating that a first optical channel data unit is multiplexed to a second optical channel data unit, the label includes a tributary slot type indication field that is used for indicating a tributary slot type of the second optical channel data unit, and the label further includes a tributary slot assignment indication field that is used for indicating a tributary slot occupied in the second optical channel data unit into which the first optical channel data unit is multiplexed.

The multiplexing unit 1302 is configured to multiplex the first optical channel data unit to the second optical channel data unit according to field information in the label.

The label obtained by the obtaining unit 1301 further includes a first signal type indication field that is used for indicating a signal type of the first optical channel data unit; and a second signal type indication field that is used for indicating a signal type of the second optical channel data unit.

Figure 14:
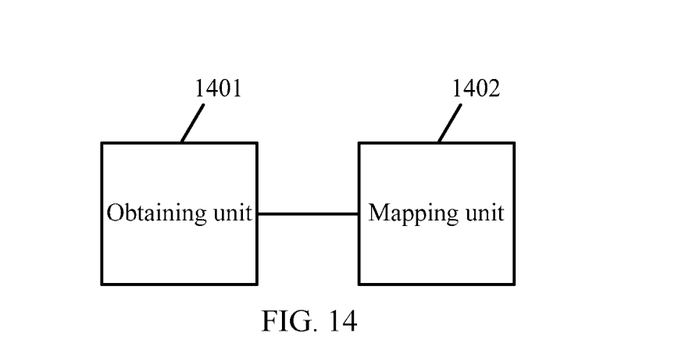
FIG. 14 is a schematic diagram of a structure 4 of an optical communication device according to an embodiment of the present invention.

FIG. 14 is a schematic diagram of a structure 4 of an optical communication device according to an embodiment of the present invention.

As shown in FIG. 14, the optical communication device includes: an obtaining unit 1401 and a mapping unit 1402.

The obtaining unit 1401 is configured to obtain a label by a signaling message of General Multi-Protocol Label Switching, in which the label is used for indicating that an optical channel data unit is mapped to an optical channel transport unit, the label includes a first signal type indication field that is used for indicating a signal type of the optical channel data unit; and the label further includes a second signal type indication field that is used for indicating a signal type of the optical channel transport unit.

The mapping unit 1402 is configured to map the optical channel data unit into the optical channel transport unit according to field information in the label.

Figure 15:
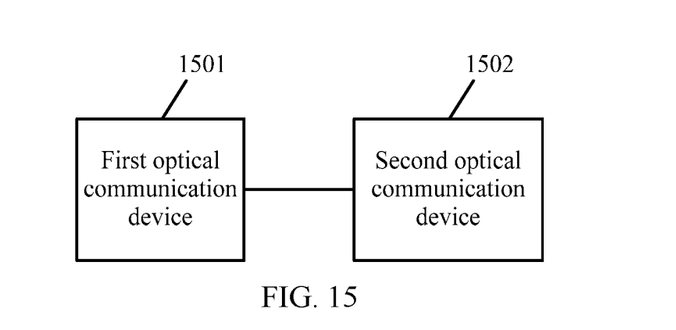
FIG. 15 is a schematic structural diagram of an optical communication system according to an embodiment of the present invention.

FIG. 15 is a schematic structural diagram of an optical communication system according to an embodiment of the present invention.

As shown in FIG. 15, the optical communication system includes: a first optical communication device 1501 and a second optical communication device 1502.

Implementation 1

The first optical communication device 1501 is configured to learn that a label switched path is required to be established in an optical network; generate a label according to a signal type of the label switched path and network resources, in which the label is used for indicating that a first optical channel data unit is multiplexed to a second optical channel data unit; the label includes a tributary slot type indication field that is used for indicating a tributary slot type of the second optical channel data unit, and the label further includes a tributary slot assignment indication field that is used for indicating a tributary slot occupied in the second optical channel data unit into which the first optical channel data unit is multiplexed; and send the label to a node on the label switched path by a signaling message of General Multi-Protocol Label Switching.

The second optical communication device 1502 is configured to obtain the label by the signaling message of General Multi-Protocol Label Switching sent by the first optical communication device 1501, and multiplex the first optical channel data unit to the second optical channel data unit according to field information in the label.

When one label exists, the label is generated by the first optical communication device 1501.

The first optical communication device 1501 sends the label to an upstream neighboring optical communication device of the optical communication device or a downstream neighboring optical communication device of the optical communication device on the label switched path by the signaling message.

Alternatively, when multiple labels exist, a label is generated by the first optical communication device 1501 for each of multiple downstream optical communication devices of the optical communication device on the label switched path.

The first optical communication device 1501 sends the label to each of the multiple downstream optical communication devices by the signaling message.

Implementation 2

The first optical communication device 1501 is configured to learn that a label switched path is required to be established in an optical network; generate a label according to a signal type of the label switched path and network resources, in which the label is used for indicating that an optical channel data unit is mapped to an optical channel transport unit, the label includes a first signal type indication field that is used for indicating a signal type of the optical channel data unit, and the label further includes a second signal type indication field that is used for indicating a signal type of the optical channel transport unit; and send the label to a node on the label switched path by a signaling message of General Multi-Protocol Label Switching.

The second optical communication device 1502 is configured to obtain the label by the signaling message of General Multi-Protocol Label Switching sent by the first optical communication device 1501, and map the optical channel data unit into the optical channel transport unit according to field information in the label.

In conclusion, the generated label in the embodiments of the present invention is used for indicating that the first optical channel data unit is multiplexed to the second optical channel data unit, the label includes a tributary slot type indication field that is used for indicating a tributary slot type of the second optical channel data unit, and the label further includes a tributary slot assignment indication field that is used for indicating a tributary slot occupied in the second optical channel data unit into which the first optical channel data unit is multiplexed. In this way, both the original and new signal types and the original and new tributary slot types can be supported by the generated label in the embodiments of the present invention, and therefore labels may be assigned for an OTN network supporting different signal types and tributary slot types.

It should be noted that the content such as information interaction and execution among the units of the device and the system is based on the same concept of the method embodiments of the present invention, so that the specific content may be referred to the illustration of the method embodiments of the present invention, the description of which are no longer provided here.

Those skilled in the art should understand that all or a part of the steps of the method according to the embodiments may be implemented by a program instructing relevant hardware. The program may be stored in a computer readable storage medium. The storage medium may include a Read Only Memory (ROM, Read Only Memory), a Random Access Memory (RAM, Random Access Memory), a magnetic disk or an optical disk.

The method for assigning and processing a label in an optical network, the optical communication device, and the optical communication system according to the embodiments of the present invention are introduced in detail in the foregoing. The principle and implementation of the present invention are described herein through specific examples. The description about the embodiments of the present invention is merely provided for ease of understanding of the method and core ideas of the present invention. Persons skilled in the art can make variations to the present invention in terms of the specific implementations and application scopes according to the ideas of the present invention. Therefore, the specification shall not be construed as a limit to the present invention.

What is claimed is:

1. A communication method in an optical network, comprising:
   generating, by a first optical communication device, a label indicating that a first optical channel data unit is multiplexed to a second optical channel data unit, wherein the label comprises a tributary slot assignment indication field indicating a tributary slot occupied in the second optical channel data unit, and a length of the tributary slot assignment indication field is equal to the number of tributary slots of the second optical channel data unit;
   sending, by the first optical communication device, the label to a second optical communication device;
   obtaining, by the second optical communication device, the label; and
   multiplexing, by the second optical communication device, the first optical channel data unit to the second optical channel data unit based on the label.

2. The method according to claim 1, wherein the label further comprises a tributary slot type indication field indicating a tributary slot type of the second optical channel data unit.

3. The method according to claim 1, wherein the label further comprises:
a first signal type indication field indicating a signal type of the first optical channel data unit; and
a second signal type indication field indicating a signal type of the second optical channel data unit.

4. The method according to claim 1, wherein the label further comprises a length field indicating the length of the tributary slot assignment indication field.

5. The method according to claim 1, wherein: the tributary slot assignment indication field uses a set value at a different bit to indicate the tributary slot occupied in the second optical channel data unit into which the first optical channel data unit is multiplexed.

6. An optical communication system, comprises a first optical communication device and a second optical communication device,
wherein the first optical communication device is configured to:
generate a label, wherein the label is used for indicating that a first optical channel data unit is multiplexed to a second optical channel data unit; wherein the label comprises a tributary slot assignment indication field indicating a tributary slot occupied in the second optical channel data unit, and a length of the tributary slot assignment indication field is equal to the number of tributary slots of the second optical channel data unit; and
send the label to the second optical communication device; and
wherein the second optical communication device is configured to:
obtain the label; and
multiplex the first optical channel data unit to the second optical channel data unit based on the label.

7. The optical communication system according to claim 6, wherein the label further comprises a tributary slot type indication field indicating a tributary slot type of the second optical channel data unit.

8. The optical communication system according to claim 6, wherein the label further comprises:
a first signal type indication field indicating a signal type of the first optical channel data unit; and
a second signal type indication field indicating a signal type of the second optical channel data unit.

9. The optical communication system according to claim 6, wherein the label further comprises a length field indicating the length of the tributary slot assignment indication field.

10. The optical communication system according to claim 6, wherein the tributary slot assignment indication field uses a set value at a different bit to indicate the tributary slot occupied in the second optical channel data unit into which the first optical channel data unit is multiplexed.

* * * * *